United States Patent [19]

Sinclair et al.

[11] Patent Number: 5,492,500

[45] Date of Patent: Feb. 20, 1996

[54] BALLOONS HAVING IMPROVED RESISTANCE TO OXIDATION

[75] Inventors: Harold K. Sinclair; Donald K. Burchett, both of Louisville, Ky.

[73] Assignee: Hi-Float Co., Inc., Louisville, Ky.

[21] Appl. No.: 294,433

[22] Filed: Aug. 23, 1994

Related U.S. Application Data

[63] Continuation of Ser. No. 7,114, Jan. 21, 1993, abandoned.

[51] Int. Cl.⁶ ............................ A63H 27/10; B05D 5/00
[52] U.S. Cl. ........................ 446/220; 244/31; 427/393.5
[58] Field of Search ................... 446/220–226; 244/31, 33; 427/393.5

[56] References Cited

U.S. PATENT DOCUMENTS

| | | | |
|---|---|---|---|
| 2,170,947 | 8/1939 | Habgood et al. | 154/2 |
| 2,514,194 | 7/1950 | Cline | 260/41.5 |
| 2,646,370 | 7/1953 | Nelson | 117/94 |
| 2,929,110 | 3/1960 | Nickerson et al. | 18/58.7 |
| 2,941,257 | 6/1960 | Davis | 18/58.5 |
| 3,062,696 | 11/1962 | Riehl | 156/128 |
| 3,286,011 | 11/1966 | Kavalir et al. | 264/306 |
| 3,411,982 | 11/1968 | Kavalir et al. | 161/242 |
| 3,415,767 | 12/1968 | Kelly | 260/27 |
| 3,475,201 | 10/1969 | Hundt et al. | 117/94 |
| 3,626,052 | 12/1971 | Sisco et al. | 264/301 |
| 3,914,478 | 10/1975 | Johansson et al. | 427/393.5 |

*Primary Examiner*—Mickey Yu
*Attorney, Agent, or Firm*—Wood, Herron & Evans

[57] ABSTRACT

The oxidation resistance of elastomeric balloons made from natural rubber is greatly improved by coating the exterior of the balloon with a film of uncured elastomer, preferably neoprene. The uncured elastomer coating maintains the clarity of the inflated balloons. These balloons are particularly useful as containers for gifts or in balloon sculpture.

10 Claims, No Drawings

BALLOONS HAVING IMPROVED RESISTANCE TO OXIDATION

This application is a continuation of application Ser. No. 08/007,114 filed Jan. 21, 1993, abandoned.

BACKGROUND OF THE INVENTION

Toy balloons are made from natural rubber. Only natural rubber has the strength, very high elongation at break, and other properties needed for the toy balloon. A major problem with these balloons has been that when they are inflated, they slowly discolor and go from a shiny, bright color to a flat, dull color within a few hours or days. Natural rubber is very susceptible to oxidation caused by reaction with the small amount of ozone in the air and by reaction with oxygen catalyzed by ultraviolet radiation in sunlight. The reactions proceed much faster when the rubber is strained, such as when the balloon is inflated. Oxidation is retarded in the uninflated balloon through the addition of small amounts of wax which bloom to the surface of the rubber and form a protective coating. However, when the balloon is inflated, this wax coating breaks and exposes the surface of the balloon to oxidation. Oxidation occurs much more rapidly in hot weather, or in outside locations where ultraviolet radiation from sunlight is greater.

This oxidation reaction causes the formation of microscopic cracks on the surface of the balloon which scatter light and make the balloons change in appearance. Balloons that are initially clear gradually turn to an opaque, dull, white color on oxidation and are no longer transparent. Oxidation turns colored balloons from a bright, shiny color to a dull, flat color.

In recent years, inflated clear balloons have become popular containers for stuffed animals, toys, and a wide variety of other merchandise and gifts. Articles are placed inside large, inflated clear balloons which resemble giant bubbles. This has been made possible through the development of the balloon stuffer machine, a device which holds a balloon open by applying a vacuum to the outside of it. This allows large items to be placed inside the balloon. Many stores and retailers have come to use balloons as "wrapping" for gifts in order to sell the merchandise that goes inside the balloon.

When the clear balloon oxidizes, it becomes cloudy or opaque, and it is no longer possible to see the merchandise inside. Therefore, the value of the balloon as a gift wrapper becomes very diminished. Also, this problem of oxidation makes it impossible for retailers to make up stuffed balloons in advance since the balloons will turn opaque and will no longer be marketable. Another problem is that the return rate is high when people who purchase clear balloons with items inside become dissatisfied when the balloons lose their transparency in a short period of time and the merchandise inside can no longer be seen.

In addition to balloons stuffed with merchandise, many air and helium filled balloons used as decorations suffer from deteriorating appearance and appeal because of the formation of a layer of surface oxidation. This is especially true for large balloon decorations or balloon sculptures which must remain in place for several days, such as in shopping centers. A much greater market for balloon decorations would be possible if the balloons could be made to keep their bright, shiny appearance for several days.

Retailers have attempted to solve this problem of balloons becoming opaque due to oxidation in a number of ways; however, none of these solutions are completely satisfactory. One solution involves coating the inflated balloon with spray furniture wax and then buffing it to remove excess wax. Other materials used to coat inflated balloons in attempts to retard oxidative opacification are silicone oils, light petroleum oils, hair spray containing lacquer, and clear acrylic spray. However, these materials have a number of problems. They are difficult and time consuming to apply, and many of them cause the balloons to burst or deflate in highly oxidizing conditions such as hot weather or sunlight. Furthermore, they are expensive to use, and at best they retard opacification of the balloon for only a few days or less under typical conditions. Another disadvantage is that the wax and oil coatings smudge easily when handled leaving unsightly fingerprints on the balloon.

Another method used to retard oxidative opacification of balloons is to coat the inflated balloon with an aqueous solution of polyvinyl alcohol. Although this prevents opacification for an extended period of time, it has the disadvantage of being very time consuming and messy to apply. This requires a large area to hang the inflated balloons to drip and dry, and drying takes at least 30 minutes. Therefore, this method cannot be used at the point of sale if space is limited such as a kiosk in a shopping mall. Furthermore, it has been found that latex balloons with an outside coating of polyvinyl alcohol have a tendency to deflate or burst in hot weather if they are not kept in an air conditioned environment. This greatly limits the usefulness of balloons coated with polyvinyl alcohol.

It is known to make large size (3 foot and larger inflated diameter) meteorological balloons used to carry weather instruments aloft from neoprene synthetic rubber since it has better physical properties than natural rubber at the low temperature of high altitude. U.S. Pat. No. 3,415,767 relates to plasticizers for neoprene meteorological balloons to further improve low temperature properties at high altitude. U.S. Pat. No. 3,626,052 discloses making meteorological balloons having improved low temperature properties from a polyisoprene-neoprene film containing compatible plasticizers. U.S. Pat. No. 2,646,370 discloses a method of increasing the freeze resistance of neoprene film after it has been cured.

U.S. Pat. No. 3,475,201 discloses improving the ozone resistance and tensile strength of neoprene meteorological balloons by coating them with a cured composition composed of a filler such as carbon black and an elastomeric polymer of an alkylene oxide or alpha-olefins.

U.S. Pat. No. 2,929,110 relates to manufacture of a streamlined meteorological balloon by forming two spherical neoprene balloons, coating one end of each balloon with natural rubber latex, drying the coating, then joining the two balloons together at the coated ends, and subsequently heat curing the entire assembly while the balloons are held in the joined position.

U.S. Pat. No. 3,062,696 relates to pneumatic tires having improved resistance to groove cracking by coating the unvulcanized tire tread with a neoprene cement and subsequently co-curing the coating and fire.

U.S. Pat. Nos. 3,411,982 and 3,286,011 relate to elastomer articles such as gloves and girdles having an improved "slip coating" to aid the wearer in donning and removing. The slip coating is a blend of an elastomer and an alkyl acrylate resin. Neoprene is disclosed as an elastomer component of the slip finish. The coated article is a natural or synthetic rubber latex dipped film. This patent does not disclose or suggest to use neoprene coating on balloons.

U.S. Pat. No. 2,941,257 relates to a coating of chloroprene (neoprene) over latex in producing rubber gloves which are more resistant to the action of oils and detergents.

None of these patents provide any insight into avoiding the opacification or clouding of transparent balloons. Certainly transparency is not a concern with any of the articles discussed in these references.

BRIEF DESCRIPTION OF THE INVENTION

It has now been found that natural rubber balloons can be made to resist opacification caused by surface oxidation by coating the balloons with a thin layer of uncured elastomer such as neoprene synthetic rubber. A coating of as little as 0.5 gram of neoprene on the outside surface of a clear balloon having an inflated diameter of 41 cm. is sufficient to keep the inflated balloon free of opacification for several months under typical conditions. In an uncoated balloon opacification begins within a few hours or a few days at most.

In the preferred embodiment of this invention, a neoprene coating is applied during the process of manufacturing a natural rubber latex balloon. According to this method, a balloon is formed as known in the art by dipping a mold into a coagulant solution; subsequently dwelling it in a compounded natural rubber latex to build up the desired thickness of rubber gel; subsequently leaching the gel in hot water; and subsequently drying and curing the gel in a hot air oven. In the present invention, the mold, still containing the latex balloon, is then dipped into neoprene latex which does not contain curatives in order to deposit a thin layer of non-curing neoprene gel on the outside surface. The neoprene coating is then air dried and dusted with talcum powder or other surface treatment to remove surface tackiness. The balloon containing the neoprene coating is subsequently stripped from the mold and processed in the usual manner known in the art.

DETAILED DESCRIPTION OF THE INVENTION

According to the present invention, a transparent toy balloon with an oxidation resistant outer surface is formed by coating a natural rubber balloon with an uncured rubber coating. In the present invention, transparent refers to light transmission of the inflated balloon. Transparent colored balloons which absorb certain, but not all, wavelengths of light and permit viewing the inside of the balloon are considered transparent. For purposes of the present invention, the balloons are manufactured from polyisoprene. 1,4-polyisoprene is generally used, and specifically natural rubber.

The outer coating, which can be applied to an uninflated natural rubber balloon during the manufacturing operation and which imparts resistance to opacification of the balloon after inflation, must meet a number of criteria. For example, the coating must tolerate about 5000% up to about a 6400% increase in surface area which occurs during balloon inflation without losing adhesion or splitting.

The coating must be continuous and essentially free of gaps or discontinuities. Surprisingly, it was discovered that even a very small gap in the protective coating causes greatly accelerated oxidation of the natural rubber substrate to occur at that location until the natural rubber is breached and the balloon deflates and/or bursts. Coating a balloon to protect it from oxidation with a coating that contains gaps was found to greatly reduce the inflated life of the balloon.

In typical summertime conditions, balloons having imperfect coatings containing even a few gaps were found to deflate and/or burst within hours after inflation. Uncoated balloons in the same environment were found to remain inflated for months although they became oxidized.

In order to impart optical clarity to a transparent balloon, the coating itself must be optically clear. Therefore, the coating must be thin and free of light-scattering inhomogeneities. Adhesion of the coating must be adequate to hold the coating on the balloon during storage and handling of the balloon and during inflation. The coating must resist oxidative attack. The coating should be neither oily nor gummy to the touch and should not leave unsightly fingerprints when touched.

The preferred coating is uncured neoprene. Uncured elastomer gel coatings other than neoprene were found to work in this invention. The coating must adhere to the balloon, have about 5000% extendibility, oxidation resistance, and be clear. High molecular weight silicone gum rubbers such as SE 30 OLB (General Electric Co.) and SE 54 OLB (General Electric Co.) dissolved in a non-polar organic solvent can be dip coated onto the cured natural rubber balloon. Other solvent based polymers suitable for use include Nordel EPDM Type 2522 and Type 1320 (E.I. DuPont de Nemours & Co.), and Polysar EPM 306 (Polysar Co.) dissolved in non-polar organic solvents. Further, uncured polyisoprene (natural or synthetic) as well as uncured Buna rubber, polyurethane rubber, polybutadiene, isobutylene-isoprene rubber, acrylate rubber, and nitrile rubber can be used. However, neoprene is the preferred coating since it could be applied from a water based latex thereby avoiding the safety and environmental problems associated with handling organic solvents. Neoprene coatings were also found to be superior in optical clarity to the EPDM and EPM coatings, and superior to the silicone rubber coatings in resistance to smudging.

It was discovered that a coating of uncured neoprene rubber which is 7 to 15% of the balloon wall thickness meets all of the above requirements. In the uncured state, it is stretchable enough to expand over 6400% in surface area as the balloon is inflated without splitting or forming gaps. Uncured neoprene is durable enough to allow coating the balloon long before use. It is non-oily and dry to the touch. It is optically clear enough to yield a coated balloon with excellent transparency. It is economical enough that it does not add significantly to the cost of the finished balloon.

The preferred method of manufacturing a balloon coated with uncured neoprene is as follows. A balloon shaped dipping mold typically made of aluminum, glass, or plastic is thoroughly cleaned, rinsed, and heated to 60°–65° C. The mold is dipped into a coagulant solution containing approximately 25% calcium nitrate and a wetting agent (0.1% Igepal CO-630 nonionic wetting agent (GAF Co.) in a water or alcohol base. The mold is then removed from the coagulant dip and allowed to air dry.

Natural rubber latex is compounded by adding the following parts per hundred latex: potassium hydroxide (0.60), ammonium caseinate (0.10), heptene base (0.15), sulfur (1.25), zinc oxide (2.10), methyl zimate (0.30), and antioxidant (1.25). The mixture is diluted with water to 54% total solids. The mold is dipped into the compounded latex and dwelled a sufficient time to build up an adequate thickness of coagulated rubber. Rubber thickness can be varied by adjusting dwell time. For example, a dwell time of 30 seconds produces a film gauge of 0.013 inches (0.033 cm). The mold is then removed slowly to allow for drainage of the excess compound.

The mold is suspended in air for 5 minutes to allow the rubber to completely gel. It is then leached in warm (55° C.) water for 15 to 30 minutes to remove water soluble salts. Immediately following leaching, a rolled bead is then formed on the edge of the balloon opening by rolling the edge of the gel a short distance down the mold as is well known in the art.

The mold containing the gelled rubber is then dried in a forced-air oven at 70° C. for 15 minutes and then cured in an air oven at 100° C. for 30 minutes. The mold is subsequently cooled in air for 30 minutes.

A neoprene latex dip bath is prepared by adding 87 parts of water to 1662 parts of Type L-115 Neoprene latex (E.I. DuPont de Nemours & Co.) and 0.275 parts of Polystep B-24 surfactant (Stepan Co.). The viscosity of the neoprene dip bath significantly influences coating evenness. The preferred neoprene latex is DuPont Neoprene Type L-115 (E.I. DuPont de Nemours & Co.). It is high enough in viscosity for single-coat pickup and uniform complete coverage. The viscosity of the neoprene latex, and hence the amount of pick-up, is easily controlled by diluting the latex with water. The preferred Brookfield viscosity of the diluted neoprene latex is in the range of 140 to 180 centipoise. If diluted too much, the resulting coating is too thin and contains gaps. A dried neoprene coating which is no more than 7 to 15% of the balloon wall thickness gives adequate clarity initially on inflation, and yet is sufficient to give excellent long term protection against opacification. Sodium lauryl sulfate (Polystep B-24) is added to the neoprene dip bath to assist wetting of the balloon substrate and improve the homogeneity and uniformity of the coating. However, many other types of surfactants should be equally as effective.

The mold containing the cured natural rubber is then dipped into the neoprene latex bath and slowly withdrawn to allow for drainage of the excess latex. It is then dried in warm air for 30 minutes.

The dried coating is dusted with talcum powder to reduce the surface tack and the balloon is stripped from the mold by hand or mechanically using methods known in the art.

It will be recognized by those skilled in the art that the sequence of the neoprene coating step can be altered without changing the outcome. For example, natural rubber balloons which had been previously manufactured could be pulled onto molds, cleaned, and then dip coated with neoprene latex using the present invention. Also, the neoprene coating step can be done after the natural rubber gel is formed on the mold and leached in hot water but before it is dried and cured. Another variation is to perform the neoprene coating step after the natural rubber gel is partially dried and/or cured.

Although the preferred embodiment uses neoprene latex containing no curatives, it will be recognized by those skilled in the art that very low levels of curatives may be added to the neoprene or may migrate from the natural rubber into the neoprene coating without altering the outcome. In any case, the neoprene coating must remain uncured, i.e., contain relatively few crosslinks, in order to undergo the extreme expansion on inflation of the balloon without tearing or forming gaps in the coatings.

EXAMPLE No. 1

Balloons A and B having inflated diameters of 41 cm. were prepared by heating and dipping plastic molds into an aqueous coagulant solution containing 25% calcium nitrate, 4% talcum powder, and 0.1% Igepal CO-130 wetting agent. The molds were then dipped into compounded natural rubber latex, Vultex 1-V-731-A (General Latex Co.), and dwelled for 30 seconds. The molds were then slowly removed from the latex to allow drainage of the excess compound. The molds were suspended in air for 5 minutes to allow the gel to set firmly, and a bead was then rolled onto the opening of each balloon. The molds containing the balloons were leached in water at 58° C. for 20 minutes. The molds were then dried in a hot air oven for 15 minutes at 73° C. and cured at 100° C. for 30 minutes.

After cooling to room temperature, balloon A was dusted with talcum powder and stripped from the mold by hand.

The mold containing balloon B was dipped into a neoprene latex bath containing 1662 parts Neoprene Latex Type L-115 (E.I. DuPont de Nemours & Co.), 87 parts water, and 0.275 parts Polystep B-24 surfactant and slowly withdrawn to allow drainage of the excess latex. The neoprene coating was then dried overnight in air. The balloon was then dusted with talcum powder and stripped from the mold by hand.

The balloons were inflated with air and aged to observe oxidative opacification. Uncoated balloon A was significantly oxidized after 3 days exposure and was no longer transparent after 5 days. On the other hand, the neoprene coated balloon B remained transparent throughout the 140 day duration of the test.

EXAMPLE No. 2

Three clear balloons having an inflated diameter of 28 cm manufactured by the Pioneer Balloon Company were coated with a thin layer of uncured neoprene gel using the following procedure. The balloons were pulled onto dipping molds and washed in a commercial dish washing detergent, rinsed with water, and then immersed in clean water for 3 minutes. The balloons were then quickly immersed in an aqueous presetting bath containing 0.5% sodium lauryl sulfate and 4.5% DuPont Neoprene Latex Type L-115 (E.I. DuPont de Nemours & Co.). After 3 minutes in the presetting bath, the balloons were slowly withdrawn, then quickly immersed in a dipping bath of DuPont Neoprene Latex Type L-115 which had been diluted with water to a Brookfield viscosity of 160 centipoise. The balloons were held in neoprene bath for 3 minutes and were then slowly removed to allow drainage of excess liquid. The neoprene coatings were then air dried overnight and dusted with talcum powder to remove surface tackiness. The weight of the coatings ranged from 0.43 to 0.53 gms.

Along with an uncoated control balloon, the three coated balloons were inflated with air and aged to observe oxidative opacification. After only one day of exposure, the uncoated control balloon was completely oxidized to an opaque white. The three neoprene coated balloons were still clear and transparent after seven days.

EXAMPLE No. 3

A dip coating solution was prepared by dissolving high molecular weight silicone gum rubber SE 30 OLB (General Electric Co.) in a mixture of 97% by volume paint thinner Type 5132 (Porter Paint Co.) and 3% by volume acetone to achieve a level of 18% gum rubber. A clear balloon having an inflated diameter of 41 cm. manufactured by the Pioneer Balloon Company was placed on a mold, dipped into the coating solution, and then slowly removed allowing drainage of the excess solution. The coating was air dried overnight and was then dusted with talcum powder to reduce surface tackiness. The weight of the coating was 1.45 gams.

The balloon was inflated along with an uncoated control to observe oxidative opacification. The uncoated control balloon began to exhibit visible oxidation after 2 days and had become completely opaque by the eighth day. The balloon coated with silicone gum rubber remained completely transparent throughout the 37 day duration of the test.

These examples demonstrate that an uncured elastomeric coating significantly reduces opacification caused by oxidation of the surface of the inflated toy balloon. The coating can be applied during the manufacture of the balloon or can be applied to a previously prepared balloon.

This coating in turn improves the utility of these balloons making them much more desirable for displaying articles as well as for use in balloon sculpture and the like.

This has been a description of the present invention as well as the best mode of practicing the invention currently known to the inventors.

The invention, however, should be defined by the appended claims wherein we claim:

1. The method for manufacturing a transparent natural rubber inflatable and expandable toy balloon having superior resistance to oxidation when the balloon is in an expanded state comprising forming a natural rubber toy balloon;

coating an exterior surface of said balloon with an optically clear, uncured elastomeric coating; and drying said coating without curing said elastomeric coating whereby said uncured elastomeric coating retards oxidation opacification of said transparent natural rubber toy balloon when inflated.

2. The method of claim 1 where the coating is applied by dipping said balloon into an aqueous latex of the coating elastomer.

3. The method claimed in claim 2 wherein said aqueous latex of said coating elastomer further includes a surfactant.

4. The balloon made according to the method of claim 1.

5. A natural rubber toy balloon having an exterior coating of an optically clear, uncured elastomer wherein said balloon is transparent when in an inflated state and is expandable to about 5,000 percent on a surface area basis from an uninflated state to the inflated state;

and wherein said coating retards oxidative opacification of said balloon in the inflated state.

6. The balloon of claim 5 where the uncured elastomer is neoprene.

7. The balloon of claim 5 where the uncured elastomer is selected from the group consisting of neoprene, EPDM, EPM, silicone rubber, nitrile rubber, polyurethane rubber, acrylate rubber, Buna rubber, polyisoprene, polybutadiene, and isobutylene-isoprene rubber.

8. The balloon claimed in claim 7 wherein said coating has at least 5000% extendibility.

9. The balloon claimed in claim 8 coated with an anti-sticking agent.

10. The balloon claimed in claim 5 wherein said coating has a thickness of 1 to 15% of a wall thickness of said balloon.

* * * * *